United States Patent
Frimout et al.

(10) Patent No.: US 9,629,225 B2
(45) Date of Patent: Apr. 18, 2017

(54) APPARATUS AND METHOD FOR INTERPRETING RECEIVED CONTROL COMMANDS

(71) Applicant: PHILIPS LIGHTING HOLDING B.V., Eindhoven (NL)

(72) Inventors: Emmanuel David Lucas Michael Frimout, Nuenen (NL); Bozena Erdmann, Aachen (DE)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 41 days.

(21) Appl. No.: 14/434,771

(22) PCT Filed: Oct. 1, 2013

(86) PCT No.: PCT/IB2013/059033
§ 371 (c)(1),
(2) Date: Apr. 10, 2015

(87) PCT Pub. No.: WO2014/060890
PCT Pub. Date: Apr. 24, 2014

(65) Prior Publication Data
US 2015/0230321 A1    Aug. 13, 2015

Related U.S. Application Data

(60) Provisional application No. 61/715,401, filed on Oct. 18, 2012.

(51) Int. Cl.
*G08B 21/00* (2006.01)
*H05B 37/02* (2006.01)
*G05B 15/02* (2006.01)

(52) U.S. Cl.
CPC ......... *H05B 37/0272* (2013.01); *G05B 15/02* (2013.01); *H05B 37/029* (2013.01); *H05B 37/0281* (2013.01)

(58) Field of Classification Search
CPC   G05B 15/02; H05B 37/0272; H05B 37/0281; H05B 37/029
USPC ....................................... 340/4.42
See application file for complete search history.

(56) References Cited

U.S. PATENT DOCUMENTS

2008/0058960 A1    3/2008  Busby
2008/0297068 A1*  12/2008  Koren ............... H05B 33/0842
                                              315/297
2010/0225238 A1*   9/2010  Medin ................. G09G 3/3413
                                              315/210

(Continued)

FOREIGN PATENT DOCUMENTS

DE      102004033668 A1    2/2006
WO         9222048 A1    12/1992

*Primary Examiner* — Mark Rushing

(57) ABSTRACT

The present invention relates to an apparatus and method for interpreting control commands received from a control element, wherein the control element sends control commands indicating start of activation (e.g., press operation) and end of activation (e.g., release operation) separately. Two time thresholds provided by respective timers (T1, T2) are used at the controlled device (20), a lower time threshold for determining the short activation and a higher time threshold for determining the long activation; the difference between the two time thresholds indicates a "dead zone" of no control action.

12 Claims, 3 Drawing Sheets

(56) References Cited

U.S. PATENT DOCUMENTS

2012/0056728 A1    3/2012  Erdmann et al.
2012/0062138 A1*   3/2012  Wilson ............... H05B 33/0815
                                                              315/254
2012/0153867 A1    6/2012  Van Den Biggelaar

* cited by examiner

APPARATUS AND METHOD FOR INTERPRETING RECEIVED CONTROL COMMANDS

CROSS-REFERENCE TO PRIOR APPLICATIONS

This application is the U.S. National Phase application under 35 U.S.C. §371 of International Application No. PCT/IB13/059033, filed on Oct. 1, 2013, which claims the benefit of U.S. Provisional Patent Application No. 61/715,401, filed on Oct. 18, 2012. These applications are hereby incorporated by reference herein.

FIELD OF THE INVENTION

The present invention relates to the field of an apparatus, system, method and computer program product for interpreting control commands received via a communication network such as—but not limited to—a ZigBee Light Link (ZLL) network for intelligent lighting solutions.

BACKGROUND OF THE INVENTION

On/off and level control of controlled devices, e.g., lighting devices or other load devices, is often done with the same control element, e.g., a switch, whereby e.g. in case of a pushbutton switch a short push is used to request a state change (e.g., on/off/toggle), and a long push of the same pushbutton switch is used to request a level change (e.g., dim/move up/down or step up/down). Conventional mains- or battery-powered control elements (e.g., remote controls, switches, dimmers) can locally measure the press duration and depending the on the measured value send the appropriate control command(s), e.g., on/off/toggle in case of a short activation, and move up/down, followed by stop or repetitive step up/down in case of a longer activation.

Extremely resource-restricted, esp. energy-restricted control elements, incl. energy-harvesting control elements which harvest energy from the actuation, are emerging thanks to the introduction of e.g. EnOcean (as defined in the ISO/IEC 14543-3-10 specification) and ZigBee Green Power systems. Such control elements may not have enough energy to differentiate between short and long activation or detect a short activation. Thus, they typically would send commands indicating start of activation (e.g., press operation) and end of activation (e.g., release operation) separately (in the following referred to as "raw control commands"). The control action (in the following referred to as "derived control action") can thus be determined by the receiver depending on the time interval between the received commands (of particular type).

However, in case of lighting applications or other network-based application, frequently more than one receiver (lamp/ballast) is controlled simultaneously by the same control element (e.g., switch or sensor or remote control), preferably using group communication (as e.g. defined in the ZigBee Light Link specification or ZigBee Green Power specification). The controlled devices may thus be located at different distances from the control element, e.g., several hops away, wherein a hop represents a link, i.e. one portion of the network path between source and destination. When communicating over a wireless mesh network, data passes through a number of intermediate devices (like routers or other network devices) rather than flowing directly over a single bus wire. Thus, the measured interval between the received commands will be influenced by the delay at the transmitting and receiving device, as well as in case of multi-hop systems all intermediate devices along the possibly different routing paths. Various aspects may contribute to this delay, including processing, channel access mechanisms, network/application quality of service (QoS) mechanisms like random jitter when multiple devices may be involved, interference and retry mechanisms, and delay on the receiving side (related to processing, other interrupts, etc.). Different intervals between the received raw control commands however, especially in case of multi-hop systems and group communication, will lead to different derived control actions, e.g., some devices in the group executing an on/off/toggle while some other devices executing dimming (to potentially differing levels).

SUMMARY OF THE INVENTION

It is an object of the present invention is to provide a reliable interpretation for received control commands at the controlled devices.

Accordingly, interpretation of first and second commands is achieved by stopping a first timer function and initiating at least one of generation and execution of a first predetermined action in response to a receipt of the second command during operation of the first timer function, by initiating at least one of generation and execution of a second predetermined action in response to a time-out of the second timer function, by initiating at least one of generation and execution of a third predetermined action in response to a receipt of the second command after time-out of the second timer function, and by stopping the second timer (240) in response to a receipt of said second command after time-out of said first timer (230) and during operation of said second timer (240).

Two time thresholds are thus used for determining the time interval between the received raw control commands. A lower time threshold for determining a short activation (e.g., button press) which is translated into at least one corresponding derived control action, and a higher time threshold for determining a longer activation (e.g., button press) which is translated into at least one other corresponding derived control action, whereby the difference between the thresholds can be greater than zero thus indicating a "dead zone" which may be translated into a corresponding further derived control action or no action at all. The proposed solution thus allows for ignoring user actions on the boundary between short and long activation, thus enabling reliably and consistently executing desired control actions. Moreover, it provides a benefit of a mental model intuitively understandable by the user in the on/off/level control case. Namely, a press only slightly longer than short, if translated into level control action would result in a tiny level change, in most cases not perceivable by human observer, thus equivalent to silently dropping the command altogether in a "dead zone".

According to a first aspect, the processing unit may further be arranged for initiating at least one of generation and execution of a fourth predetermined action in response to a receipt of the second command after time-out of the first timer and during operation of said second timer. Thereby, it can be ensured that a subsequent delayed second command cannot trigger an undesired action.

According to a second aspect which may be combined with the above first aspect, the first or second command may be transmitted from the controlled remote device to the communication network in response to each receipt of a respective one of the first and second commands at the remote device. This ensures that remote devices in direct range of the (energy-restricted) control element forward the first and second control commands, so that it is ensured that each remote device receives the first and second control commands.

According to a third aspect which can be combined with any one of the first and second aspects, a message indicating said first, second, third or fourth predetermined action is transmitted from the controlled remote device to the communication network in response to each initiation of at least one of generation and execution of a respective one of said first, second, third and fourth predetermined actions at the remote device, wherein actual execution of the respective one of the first to fourth predetermined actions is triggered by the initiation of a respective predetermined action or by receipt of the respective message. Thereby, at least one remote device in direct range of the (energy-restricted) control element forward the message indicative of the derived control action, rather than or in addition to the raw control commands. This has two positive effects: (i) it allows reducing the duration of the dead zone (which then only needs to take into account the delays across a single hop), (ii) it enables consistent control of legacy devices, i.e. devices not capable of directly receiving the raw control commands of the (energy-restricted) control element. In case both raw control commands and derived control actions are forwarded, the dead zone also allows making sure that different forwarded commands do not conflict. The third aspect may be implemented by having the controlled remote device decide to execute the corresponding predetermined action and therefore to forward the message. Another valid implementation is that the controlled remote device decides to forward the message, and because the forwarded message also reaches the forwarding controlled remote device itself (e.g., it is one of the unicast destinations or a member of the destination group/broadcast), it executes the corresponding predetermined action.

According to a fourth aspect which can be combined with any one of the first to third aspects, the first command may indicate start of an activation period at a control element (e.g. switching element or other activation element) and the second command may indicate end of an activation period at the control element. This ensures that an activation duration can be signaled to the remote device in an—for the control element—energy-efficient manner.

According to a fifth aspect which can be combined with any one of the first to fourth aspects, the first predetermined action may correspond to a derived control action for a short activation period at the control element which controls the remote device, the second predetermined action may correspond to a derived control action for a start of a long activation period at the control element, the third predetermined action may correspond to a derived control action for an end of the long activation period, and the fourth predetermined action corresponds to a derived control action for an undefined activation period as determined by the apparatus with a duration between the short activation period and the long activation period.

According to a sixth aspect which can be combined with any one of the first to fifth aspects, the remote control system may be a lighting system for controlling luminaires comprising the above apparatus. Thereby, energy-efficient control of the lighting system can be achieved. However, the present invention is of course applicable to other application as well, such as blinds control, temperature control, rotor speed, valve control, door/window control, or any other applications which can be controlled by different activation durations.

According to a seventh aspect which can be combined with any one of the first to sixth aspects, at least one of the first to fourth predetermined control actions may also be based on additional information derived from the first or second command or from additional internal or external parameters. In such an implementation, the derived control action can be made dependent on parameters or criteria other than the two commands.

It is noted that the apparatus may be implemented as a discrete hardware circuitry with discrete hardware components, as an integrated chip, as an arrangement of chip modules, or as a signal processing device or chip controlled by a software routine or program stored in a memory, written on a computer readable medium, or downloaded from a network, such as the Internet.

It shall be understood that the apparatus of claim 1, the method of claim 7, the system of claim 12, and the computer program product of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

BRIEF DESCRIPTION OF THE DRAWINGS

The invention will now be described, by way of example, based on embodiments with reference to the accompanying drawings, wherein.

DESCRIPTION OF PREFERRED EMBODIMENTS

Embodiments of the present invention will now be described based on a remote control system which uses an available wireless mesh network (e.g. an intelligent lighting network) for conveying control commands to luminaires or other controlled devices.

Figure 1:
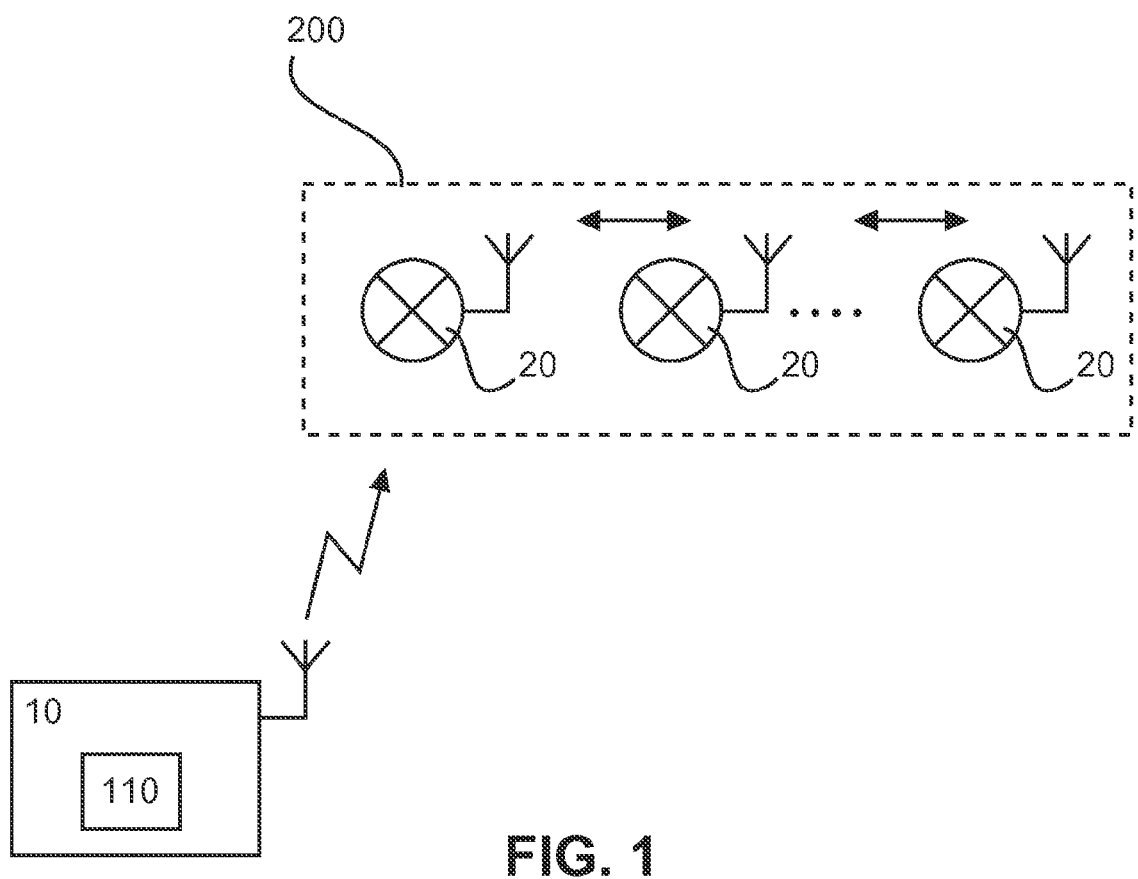
FIG. 1 shows a schematic block diagram of a system architecture in which the present invention can be implemented.

FIG. 1 shows a schematic block diagram of a system architecture in which the present invention can be implemented, The proposed remote control system comprises one or more control elements 10 with a user activation element 110, e.g. a button or a toggle switch. However, any other type of activation may be used, e.g., machine (press duration), or duration of involuntary human/vehicle/object activation, e.g. the time human (vehicle/object) weight or other force is measured in a particular location. Furthermore, it can be another type of user activation element, e.g., slider, rotating knob, touch screen, etc. The control element 10 may be battery-less device which requires no external power sources. This can be achieved by providing an internal energy harvesting mechanism or the like, which may be initiated by a user trigger action at the activation element 110 when a control action is to be initiated. The control element 10 may further comprise at least one radio communication interface via which control commands can be sent out wirelessly via a communication network 200, e.g., a building facility network.

The communication network 200 can be a standalone dedicated network or an existing network. It can be formed out of mains-powered, Power-over-Ethernet (PoE)-powered, EMerge-powered or battery-powered or even energy harvesting devices. The communication interface can be wired or wireless, using communication technologies such as Internet Protocol-based solutions, including Internet Protocol version 4, Internet Protocol version 6 and 6LoWPAN (IPv6 over Low power Wireless Personal Area Networks), ZigBee, ZigBee Light Link, ZigBee Building Automation, ZigBee Green Power, powerline communication, infrared communication, visual light communication, BACnet (Building Automation and Control Networks) protocol, KNX solution, EnOcean, etc. It can be a lighting control network, that is formed by mains-powered luminaires or other controlled devices 20 with radio interfaces in a mesh fashion, e.g., a ZigBee Light Link (ZLL) network. The radio interfaces of the controlled devices 20 receive control commands sent from the control element 10 and may forward or route these messages in a hop-fashion through the communication network 200; some or all of them may need to act upon the received control commands, e.g. by the fact of being members of a group the command is addressed to.

Figure 2:
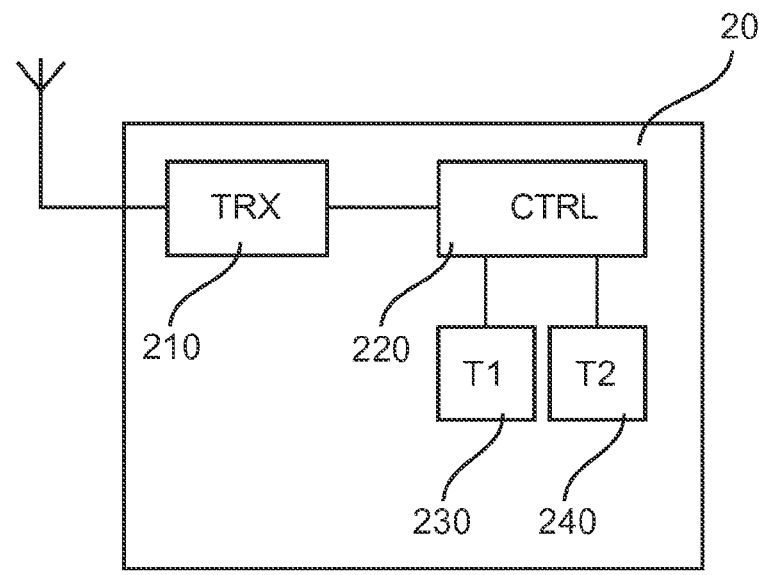
FIG. 2 shows a block diagram of a controlled device according to various embodiments.

FIG. 2 shows a block diagram of a controlled device 20 according to a first embodiment. The controlled device 20 comprises a receiver or transceiver (combination of receiver and transmitter) 210 for receiving control commands via a radio channel of the communication network 200 of FIG. 1. Furthermore, the controlled device 20 comprises a processor unit 220 with a control logic or function for implementing the control interpretation and derived control actions by utilizing at least two time thresholds for a time interval between received raw control commands. The time thresholds are implemented by a first timer (T1) 230 and a second timer (T2) 240 connected to or implemented by the processor unit 220. The first timer 230 is adapted to count a lower time threshold (i.e. shorter time period) used for determining a short activation period (e.g., short button press) at the control element 10 based on received related control commands, so as to determine a corresponding derived control action. Additionally, the second timer 240 is adapted to count up to the higher time threshold (i.e. longer time period) for determining a long activation period (e.g., long button press) at the control element 10 based on received related control commands, so as to determine a corresponding derived control action. The second timer 240 can thus be used to determine the difference between the two time thresholds (i.e. time periods), which can be greater than zero thus indicating a "dead zone" of no control action in the present embodiments (or in general a derived further control action). The dead zone corresponds to an undefined activation period (e.g. between short and long button press) with a duration between the short activation period and the long activation period. The undefined activation period thus has a duration just on the boundary between the two time thresholds and the propagation delay and may as well be interpreted differently at the receiver side (which might lead to another action or even an undefined action). In the present embodiments, the undefined action is prevented by defining the non-action for this case. The second timer 240 may start at time-out of the first timer 230 or may start simultaneously with the first timer 230. It may thus count dead zone only or the longer time period directly. In the latter case, its counted time period includes the shorter time period and the dead zone and thus ends after the time period of said first timer 230.

The principle and procedure of interpretation of the received control commands based on the states of the first and second timers 230, 240 is described later in connection with state diagrams according to first to third embodiments shown in FIGS. 3 to 5, respectively.

The duration of the lower time threshold of the first timer 230 may advantageously be derived from the short activation duration typical for a given type of the control element 10. This may be dependent on its physical characteristics, including the required press and return force, the travel, the orientation, size and/or location of the control element, etc. For the available hardware currently on the market, a value in the range of a couple of hundreds of ms may be applicable (e.g., 140-300 ms).

The dead zone which is counted by the second timer 240 (or alternatively by the difference between the second timer 240 and the first timer 230 if the second timer starts simultaneously with the first timer 230) may have a duration which accommodates for typical time differences in the reception time. As an example, for receivers within the transmission range of the energy-restricted control element 10 using broadcast-based 802.15.4 ZigBee Green Power communication, this may be as small as twice the parameter zgpdRxOffset (default: 5 ms in the ZGP 1.0 specification, ZigBee document 09-5499-23, sec. A.1.7.2.1). In case of multi-hop forwarding of the raw control commands, the dead zone may need to have the duration of several hundreds of milliseconds.

As already mentioned, the higher time threshold defines the minimum duration of a long activation period. The maximum duration of the long activation period may be unlimited. In case the user activation is timely followed by a user-perceivable system change and/or feedback, the activation will be terminated by the user when the system reaches the state intended by the user. In the case of level control, e.g. for lighting or for blinds, both communication speed and a dimming speed or a motor speed may play a role, so that the press duration may be several seconds.

In the following, three exemplary embodiments are described based on state diagrams shown in FIGS. 3 to 5. A state diagram is a type of diagram used in computer science and related fields to describe the behavior of systems. State diagrams require that the system described is composed of a finite number of states. The state diagram may also be called a state machine diagram or state chart diagram and illustrates the states (depicted as nodes or circles) of an apparatus or system as well as the transitions (depicted as arrows) between those states. In this context, a state defines a stage in the evolution or behavior of the apparatus or system, which may be a specific entity in a program or unit of code representing that entity. State diagrams are useful in all forms of object-oriented programming (OOP).

Figure 3:
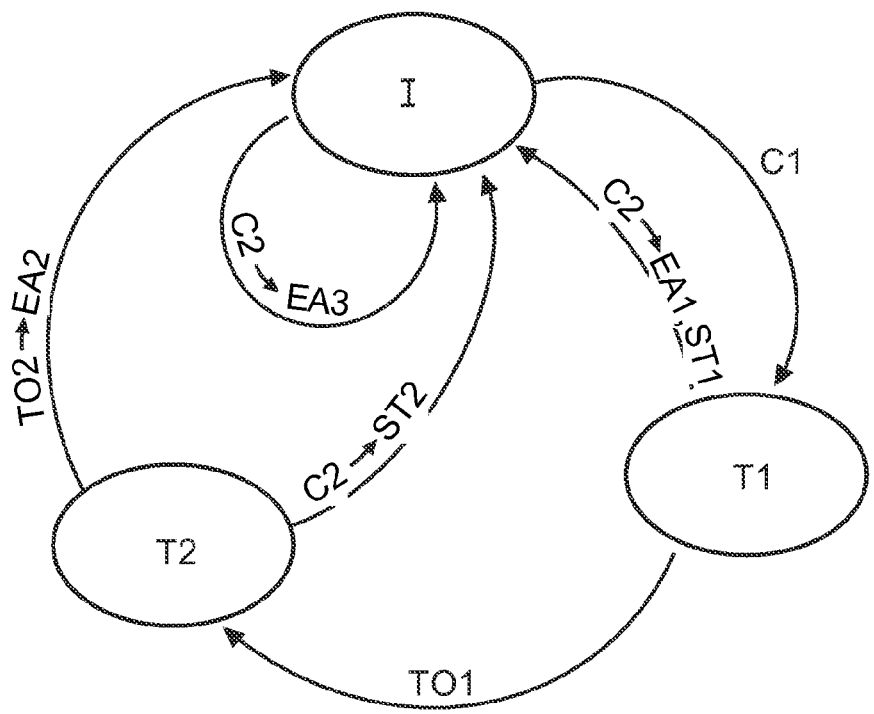
FIG. 3 shows a schematic state diagram of a state machine representation of a command interpretation processing according to a first embodiment.
Figure 4:
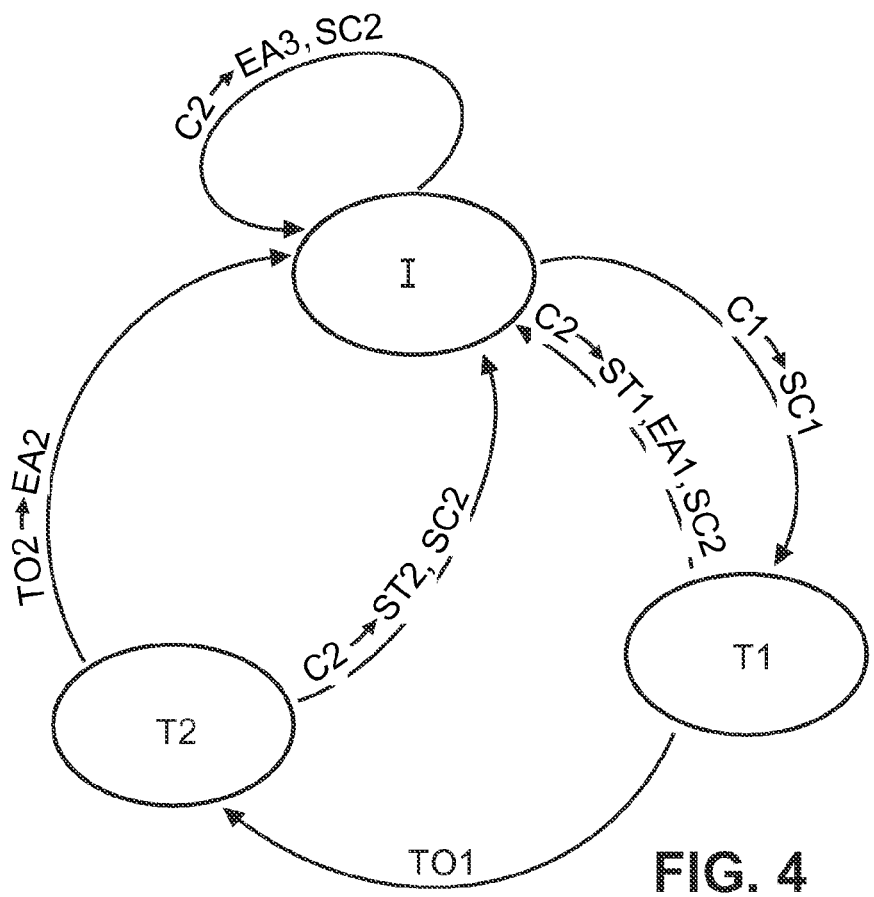
FIG. 4 shows a schematic state diagram of a state machine representation of a command interpretation processing according to a second embodiment.
Figure 5:
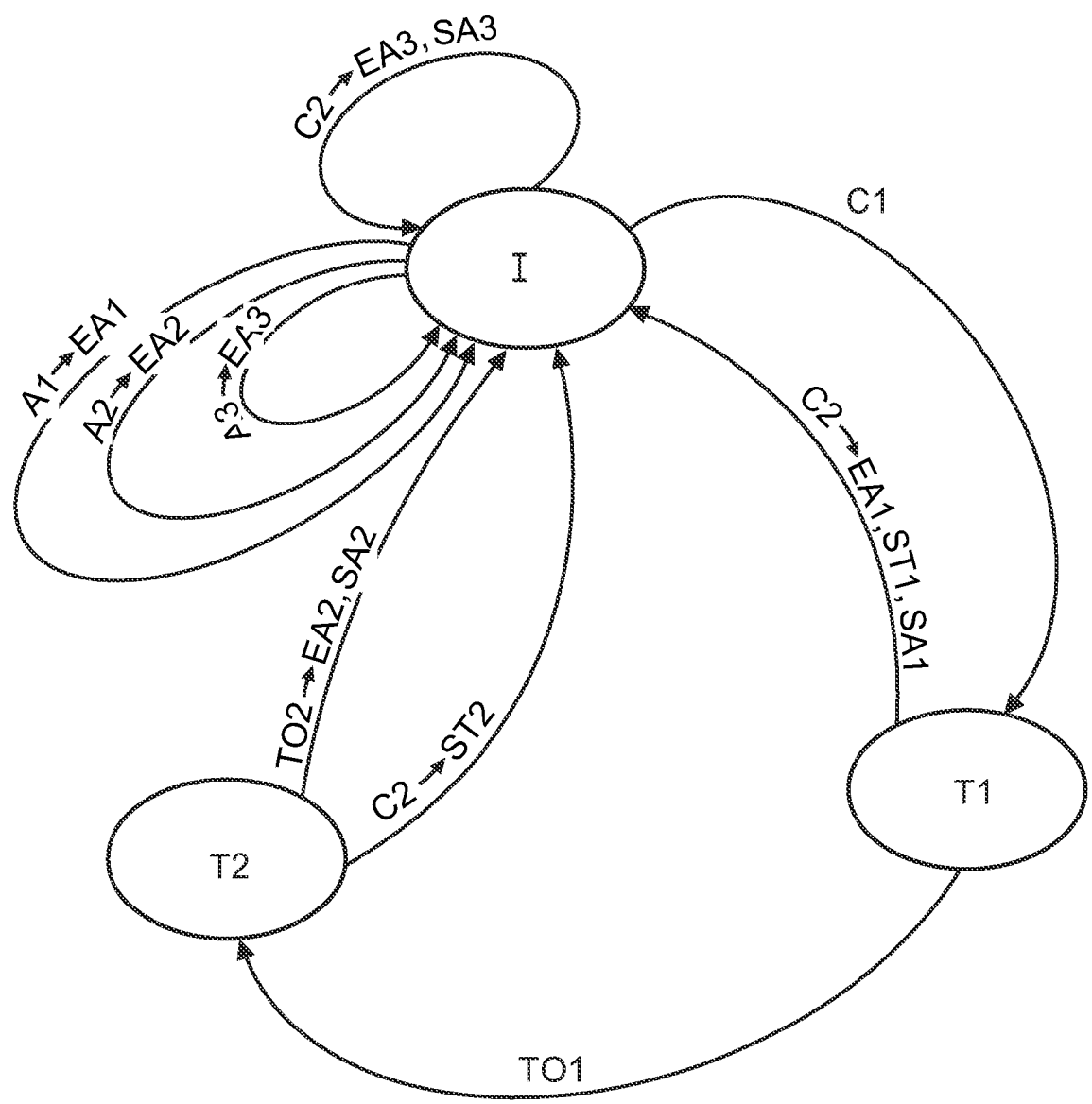
FIG. 5 shows a schematic state diagram of a state machine representation of a command interpretation processing according to a third embodiment.

In the present first to third embodiments, depicted in FIGS. 3 to 5, three states are defined. The first state (I) is an idle state where no timer operation is active. In second state (T1), the first timer operation for counting the short activation period is active. In the third state, the second timer operation for counting the dead zone period is active. Thus, the interpretation procedure of the processing unit 220 of FIG. 2 can be described by its transition behavior between the above three states. The arrows between the states in FIG. 3 to 5 indicate state changes and the cause of the changes and possible resulting actions are indicated at the arrows.

Furthermore, the following parameters are defined in the state diagram. The first command (C1) is one of the raw control commands and is sent by the control element 10 of FIG. 1 when its switch is pressed (i.e., start of activation period). The second command (C2) is the other raw control command and is sent by the control element 10 when its switch is released (i.e., end of activation period). The first time threshold (T1) defines the duration of a short press (i.e. short activation period), e.g., 200 ms. The dead zone (T2) defines the duration of the dead zone, e.g., 5 ms. The first predetermined action (A1) corresponds to the derived control action for the short press, e.g., a toggle action. The second predetermined action (A2) corresponds to the derived control action for the start of the long press, e.g., a dimming action. The third predetermined action (A3) corresponds to the derived control action for the end of the long press, e.g., stop dimming.

In the present first to third embodiments, a fourth predetermined action which corresponds to a derived control action in response to a receipt of the second command during the dead zone, is not defined, i.e., there is no derived control action associated. The fourth predetermined control action thus corresponds to no action at all. In other embodiments, for example, a feedback signalizing disallowed/undefined control operation could be provided to the user, e.g. by blinking a light emitting diode (LED) or by an audible signal, e.g., a beep, or a command confirming the previous state could be distributed to the controlled devices.

Furthermore, the derived control actions can be based solely on the (timing between the) received raw control command(s), it can also require or accept additional input, e.g., internal device state, additional input parameters, etc. For example, for the long press, the resulting level control direction (up/down) can be based on the current level and/or state (on/off). In another example, the derived control action can be based on the occupancy status or daylight level, as reported by built in or external sensors, or on a schedule, e.g., with different procedures for office and non-office hours. Moreover, the derived control action can be based on further information from the received raw control command, e.g., the sequence number or hop count, etc. For example, in case of a sequence number which is incremented by one for each raw control command, if a press command with sequence number N and within T1 and a release command with sequence number N+3 is released, the derived control action may be no action, rather than one state change or two state changes.

FIG. 3 shows a schematic state diagram of a state machine representation of a command interpretation processing according to a first embodiment where the remote device 20 does not forward any received control command or derived control action.

Initially, the procedure is in the idle state (first state) and waits for the reception of the first command (C1). If C1 is received, the processing unit 220 starts the first timer 230 and the second state T1 is entered. If C2 is received during the second state, the processing unit 220 initiates execution of the first predetermined action (EA1), e.g., toggle action, and stops the first timer 230 (ST1), so that the idle state is entered again. If no C2 is received during the first timer operation, the processing unit 220 detects a time-out of the first timer 230 (TO1) and starts the second timer 240, so that the third state (T2) is entered. If C2 is received during the third state, the processing unit 220 stops the second timer 240 (ST2) and the first state (idle state) is entered again. Thus, no predetermined action is initiated. If no C2 is received during the third state, the processing unit 220 detects time-out of the second timer 240 (TO2) and initiates execution of the second predetermined action (EA2), e.g., start dimming operation. Furthermore, the first state (idle state) is entered again. If C2 is received during the first state (idle state), the processing unit 220 initiates execution of the third predetermined action (EA3), e.g. stop dimming operation.

The above behaviour of the interpretation procedure of the first embodiment can be expressed by the following pseudo code:

```
Defines
    COMMAND1; //one of raw control commands, e.g. sent by a switch
    upon press
    COMMAND2; //another of raw control commands, e.g. sent by a
    switch upon release
    THRESHOLD1; //defining the duration of the short press
    (e.g. 200ms)
    DEAD_ZONE; // defining the duration of the dead zone (e.g. 5ms)
    ACTION1; // derived control action for the short press, e.g. toggle
    ACTION2; // derived control action for the start of the long press,
    e.g. dim
    ACTION3; // derived control action for the end of the long press,
    e.g. stop dimming
State machine
    Idle
        If COMMAND1 received
            goto Timer(THRESHOLD1);
        If COMMAND2 received
            execute ACTION3;
            goto Idle
    Timer(THRESHOLD1)
        If COMMAND2 received
            stop timer;
            execute ACTION1;
            goto Idle;
        If timeout (THRESHOLD1)
            goto timer(DEAD_ZONE);
    Timer (DEAD_ZONE)
        If COMMAND2 received
            stop timer;
            goto Idle;
        If timeout (DEAD_ZONE)
            execute ACTION2;
            goto Idle;
```

FIG. 4 shows a schematic state diagram of a state machine representation of a command interpretation processing according to the second embodiment with raw control command forwarding.

Initially, the procedure is in the idle state (first state) and waits for the receipt of the first command (C1). If C1 is received, the processing unit 220 initiates sending or forwarding of C1 to the communication network 200 (SC1) and starts the first timer 230, so that the second state T1 is entered. If C2 is received during the second state, the processing unit 220 initiates sending or forwarding of C2 to the communication network 200 (SC2) and execution of the first predetermined action (EA1), e.g., toggle action, and stops the first timer 230 (ST1), so that the idle state is entered again. If no C2 is received during the first timer operation, the processing unit 220 detects a time-out of the first timer 230 (TO1) and starts the second timer 240, so that the third state (T2) is entered. If C2 is received during the third state, the processing unit 220 initiates sending or forwarding of C2 to the communication network 200 (SC2) and stops the second timer 240 (ST2), so that the first state (idle state) is entered again. Thus, no predetermined action is initiated. If no C2 is received during the third state, the processing unit 220 detects time-out of the second timer 240 (TO2) and initiates execution of the second predetermined action (EA2), e.g., start dimming operation. Furthermore, the first state (idle state) is entered again. If C2 is received during the first state (idle state), the processing unit 220 initiates sending or forwarding of C2 to the communication network 200 (SC2) and execution of the third predetermined action (EA3), e.g. stop dimming operation.

The above behaviour of the interpretation procedure of the second embodiment can be expressed by the following pseudo code:

```
Defines
    COMMAND1; //one of raw control commands, e.g. sent by a
    switch upon press
    COMMAND2; //another of raw control commands, e.g. sent by
    a switch upon release
    THRESHOLD1; //defining the duration of the short press (e.g. 200ms)
    DEAD_ZONE; // defining the duration of the dead zone (e.g. 100ms)
    ACTION1; // derived control action for the short press, e.g. toggle
    ACTION2; // derived control action for the start of the long press,
    e.g. dim
    ACTION3; // derived control action for the end of the long press,
    e.g. stop dimming
State machine
    Idle
        If COMMAND1 received
            goto Timer(THRESHOLD1);
            send message(COMMAND1);
        If COMMAND2 received
            execute ACTION3;
            send message(COMMAND2);
            goto Idle
    Timer(THRESHOLD1)
        If COMMAND2 received
            stop timer;
            execute ACTION1;
            send message(COMMAND2);
            goto Idle;
        If timeout (THRESHOLD1)
            goto timer(DEAD_ZONE);
    Timer (DEAD_ZONE)
        If COMMAND2 received
            stop timer;
            send message(COMMAND2);
            goto Idle;
        If timeout (DEAD_ZONE)
            execute ACTION2;
            goto Idle;
```

To limit the dead zone or equivalently to increase consistency in the execution between different controlled remote devices 20, the remote devices 20 in the range of the energy-restricted control element, if they are required to forward the directly received communication to other remote devices 20 out of range (in case of groupcast or unicast communication) as described in connection with the above second embodiment, may be adapted to forward the derived control actions, rather than the raw control commands, as described in the third embodiment below.

FIG. 5 shows a schematic state diagram of a state machine representation of a command interpretation processing according to the third embodiment with derived control action forwarding.

Initially, the procedure is in the idle state (first state) and waits for the receipt of the first command (C1). If C1 is received, the processing unit 220 starts the first timer 230, so that the second state T1 is entered. If C2 is received during the second state, the processing unit 220 initiates execution of the first predetermined action (EA1), e.g., toggle action, and sending or forwarding of a message or indication of the first predetermined action to the communication network 200 (SA1), and stops the first timer 230 (ST1), so that the idle state is entered again. If no C2 is received during the first timer operation, the processing unit 220 detects a time-out of the first timer 230 (TO1) and starts the second timer 240, so that the third state (T2) is entered. If C2 is received during the third state, the processing unit 220 stops the second timer 240 (ST2), so that the first state (idle state) is entered again. Thus, no predetermined action is initiated. If no C2 is received during the third state, the processing unit 220 detects time-out of the second timer 240 (TO2) and initiates execution of the second predetermined action (EA2), e.g., start dimming operation. Furthermore, the processing unit 220 initiates sending or forwarding of a message or indication of the second predetermined action to the communication network 200 (SA2) and the first state (idle state) is entered again. If C2 is received during the first state (idle state), the processing unit 220 initiates execution of the third predetermined action (EA3), e.g. stop dimming operation, and sending or forwarding of a message or indication of the third predetermined action to the communication network 200 (SA3). Moreover, if a message or indication of the first predetermined action is received (A1) during the first state (idle state), the processing unit 220 initiates execution of the first predetermined action (EA1). Or, if a message or indication of the second predetermined action is received (A2) during the first state (idle state), the processing unit 220 initiates execution of the second predetermined action (EA2). Or, if a message or indication of the third predetermined action is received (A3) during the first state (idle state), the processing unit 220 initiates execution of the third predetermined action (EA3).

The above behaviour of the interpretation procedure of the third embodiment can be expressed by the following pseudo code:

```
Defines
    COMMAND1; //one of raw control commands, e.g. sent by a switch
    upon press
    COMMAND2; //another of raw control commands, e.g. sent by a switch
    upon release
    THRESHOLD1; //defining the duration of the short press (e.g. 200ms)
    DEAD_ZONE; // defining the duration of the dead zone (e.g. 5ms)
    ACTION1; // derived control action for the short press, e.g. toggle
    ACTION2; // derived control action for the start of the long press,
    e.g. dim
    ACTION3; // derived control action for the end of the long press,
    e.g. stop dimming
State machine
    Idle
        If COMMAND1 received
            goto Timer(THRESHOLD1);
        If COMMAND2 received
            execute ACTION3;
            send ACTION3;
            goto Idle
        If ACTION1 received
            execute ACTION1;
            goto Idle;
        If ACTION2 received
            execute ACTION2;
            goto Idle;
        If ACTION1 received
            execute ACTION1;
            goto Idle;
    Timer(THRESHOLD1)
        If COMMAND2 received
            stop timer;
            execute ACTION1;
            send ACTION1;
            goto Idle;
```

```
If timeout (THRESHOLD1)
    goto timer(DEAD_ZONE);
Timer (DEAD_ZONE)
    If COMMAND2 received
        stop timer;
        goto Idle;
    If timeout (DEAD_ZONE)
        execute ACTION2;
        send ACTION2;
        goto Idle;
```

In FIGS. 3 to 5, the idle state (first state) may be split into two states I1 and I2 which may be defined "expecting C2" (I2) and "real idle" (I1). In this case, the second idle state (I2), during which the second command (C2) is expected, would be entered if the processing unit 220 detects time-out of the second timer 240 (TO2). If C2 is received during the second idle state (I2), the processing unit 220 initiates execution of the third predetermined action (EA3) and then the first idle state (I1) is entered. As to the remaining state changes and actions of FIGS. 3 to 5, the first idle state (I1) corresponds to the idle state (first state).

It will be understood by those skilled in the art that the application may in addition need to accommodate for the cases of missing, duplicate or corrupt commands. Also, it will be evident to those skilled in the art, that an exemplary application behaviour model is described in the above embodiments. Further steps may be performed in addition, e.g., verification (e.g. of frame security protection, freshness, access control, at various layers), handling (e.g. route discovery, routing) and transmission (e.g. of acknowledgement frames on various layers). Also, it will be evident to those skilled in the art, that the forwarding of the commands or the derived control actions may be done in medium-efficient manner, e.g., only by selected controlled devices or using aliasing techniques.

In summary, the present invention relates to an apparatus and method for interpreting control commands received from a control element, wherein the control element sends control commands indicating start of activation (e.g., press operation) and end of activation (e.g., release operation) separately. Two time thresholds provided by respective timers are used at the controlled device, a lower time threshold for determining the short activation and a higher time threshold for determining the long activation; the difference between the two time thresholds indicates a dead zone of no control action.

While the invention has been illustrated and described in detail in the drawings and the foregoing description, such illustration and description are to be considered illustrative or exemplary and not restrictive. The invention is not limited to the disclosed embodiments and can be used for various buildings (for example, office, school, health care, hospitality, retail facilities) and facility management systems, where lighting networks serve an indispensible role of providing shared infrastructure for transporting messages related to other facility systems. Of course, other types of wired or non-wired communication networks can be used for conveying the proposed service request message to the public network.

Furthermore, the embodiments have been described in connection with a lighting use case in mind, but the present invention is equally applicable to blinds, HVAC (heating ventilation and air conditioning), volume and other wireless group-based or multi-hop automation use cases, which will benefit from energy-restricted, incl. energy-harvesting control elements with multiple user actions.

Moreover, the embodiments have been described in connection with on/off and level control examples, but each of the predetermined control actions can be interpreted as any control command. More than one control element can be used in the same system, even for control of the same controlled device. Furthermore, the solution is equally applicable to devices with any number and type of user interaction hardware, including one or multiple rocker switches, sliders, pushbutton switches, etc. The present invention is further applicable to any number of specified activation durations (thresholds). Hence, more than two time thresholds may be provided, allowing for e.g. three or four press durations, which could optionally be combined with some user-directed feedback (e.g. by a light emitting diode (LED)) indicating the activation duration or the control action associated with this activation duration. The request can also be made by a sequence of activations, where the number, the duration and the time spacing between the activations can be analyzed to derive the desired control action.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. As already mentioned above, the functions of the interpretation procedure, e.g. as described in connection with the above embodiments of FIGS. 3 to 5, may be implemented as software routines or computer programs which may be stored/distributed on a suitable medium such as an optical storage medium or a solid-state medium supplied together with or as a part of other hardware, but may also be distributed in other forms, such as via the Internet or other wired or wireless telecommunication systems. The mere fact that certain measures are recited in mutually different dependent claims does not indicate that a combination of these measures cannot be used to advantage. Any reference signs in the claims should not be construed as limiting the scope thereof.

The invention claimed is:
1. An apparatus for interpreting first and second control commands received via a communication channel, said apparatus comprising:
    a first timer started in response to a receipt of said first control command and counting a first predetermined time period;
    a second timer adapted to count a second predetermined time period which ends after time-out of said first timer;
    a processing unit for stopping said first timer and initiating at least one of generation and execution of a first predetermined action in response to a receipt of said second command during operation of said first timer, for initiating at least one of generation and execution of a second predetermined action in response to a time-out of said second timer, for initiating at least one of generation and execution of a third predetermined action in response to a receipt of said second command after time-out of said second timer, and for stopping the second timer without generation of an action in response to a receipt of said second command after time-out of said first timer and during operation of said second timer.

2. The apparatus according to claim 1, further comprising a transmitter for transmitting said first or second command in response to each receipt of a respective one of said first and second commands.

3. The apparatus according to claim 1, further comprising a transmitter for transmitting a message indicating one of said first, second, and third predetermined actions in response to each initiation of execution of a respective one of said first, second, and third predetermined actions by said processing unit, wherein actual execution of the respective one of the first, second and third predetermined actions is triggered by the initiation of a respective predetermined action or by receipt of the respective message.

4. The apparatus according to claim 1, wherein said first command indicates start of an activation period at a control element which controls said apparatus and said second command indicates end of an activation period at said control element.

5. The apparatus according to claim 1, wherein said first predetermined action corresponds to a derived control action for a short activation period at a control element which controls said apparatus, said second predetermined action corresponds to a derived control action for a start of a long activation period at said control element, said third predetermined action corresponds to a derived control action for an end of said long activation period at said control element.

6. A method of controlling at least one remote device by transmitting a first command indicating start of an activation period and a second command indicating end of said activation period via a channel of a communication network to said remote device, said method comprising the steps of;
  starting a first timer operation at said remote device in response to a receipt of said first command at said remote device,
  starting a second timer operation at said remote device, wherein said second timer operation ends after time-out of said first timer operation;
  initiating at least one of generation and execution of a first predetermined action at said remote device and stopping said first timer operation in response to a receipt of said second command at said remote device during said first timer operation,
  initiating at least one of generation and execution of a second predetermined action at said remote device in response to a time-out of said second timer operation;
  initiating at least one of generation and execution of a third predetermined action at said remote device in response to a receipt of said second command at said remote device after time-out of said second timer operation; and
  stopping the second timer in response to a receipt of said second command after time-out of said first timer and during operation of said second timer;
  wherein at least one of said first, second, and third predetermined actions is based on additional information derived from said first or second command or from additional internal or external parameters.

7. The method according to claim 6, further comprising transmitting said first command from said remote device to said communication network in response to each receipt of said first command at said remote device, and transmitting said second command from said remote device to said communication network in response to each receipt of said second command at said remote device.

8. The method according to claim 6, further comprising transmitting a message indicating said first, second, or third predetermined action from said remote device to said communication network in response to each initiation of execution of a respective one of said first, second, and third predetermined actions, and executing said first, second, or third predetermined action at said remote device in response to a respective initiation or in response to each receipt of said message indicating a respective one of said first, second, and third predetermined actions at said remote device.

9. A system comprising a control element and at least one apparatus according to claim 1, wherein said control element is adapted to control said at least one device by transmitting said first and second commands.

10. The system according to claim 9, wherein said system is a lighting system for controlling luminaires comprising said apparatus.

11. The system according to claim 9, wherein said control element is an energy-restricted control element.

12. A non-transient computer program storage medium comprising a computer readable program for controlling at least one remote device by transmitting a first command indicating start of an activation period and a second command indicating end of said activation period via a channel of a communication network to said remote device, wherein the computer readable program when executed on a computer causes the computer to perform the steps of;
  starting a first timer operation at said remote device in response to a receipt of said first command at said remote device,
  starting a second timer operation at said remote device, wherein said second timer operation ends after time-out of said first timer operation;
  initiating at least one of generation and execution of a first predetermined action at said remote device, and stopping said first timer operation in response to a receipt of said second command at said remote device during said first timer operation,
  initiating at least one of generation and execution of a second predetermined action at said remote device in response to a time-out of said second timer operation;
  initiating at least one of generation and execution of a third predetermined action at said remote device in response to a receipt of said second command at said remote device after time-out of said second timer operation; and
  stopping the second timer in response to a receipt of said second command after time-out of said first timer and during operation of said second timer.

* * * * *